(12) United States Patent
Isaksson et al.

(10) Patent No.: US 9,014,859 B2
(45) Date of Patent: Apr. 21, 2015

(54) SYSTEM FOR CONTROLLING AN AMBIENT AIR PARAMETER

(75) Inventors: Alf Isaksson, Vasteras (SE); Lars Brannstrom, Umea (SE)

(73) Assignee: ABB Research Ltd. (CH)

( * ) Notice: Subject to any disclaimer, the term of this patent is extended or adjusted under 35 U.S.C. 154(b) by 831 days.

(21) Appl. No.: 13/246,301

(22) Filed: Sep. 27, 2011

(65) Prior Publication Data
US 2012/0041604 A1 Feb. 16, 2012

Related U.S. Application Data

(63) Continuation of application No. PCT/EP2009/053661, filed on Mar. 27, 2009.

(51) Int. Cl.
| | |
|---|---|
| G01M 1/38 | (2006.01) |
| H04B 3/36 | (2006.01) |
| H04W 4/00 | (2009.01) |
| H04M 11/00 | (2006.01) |
| G05D 23/19 | (2006.01) |
| E21F 1/02 | (2006.01) |
| F24F 11/00 | (2006.01) |

(52) U.S. Cl.
CPC .............. *G05D 23/1905* (2013.01); *E21F 1/02* (2013.01); *F24F 11/0009* (2013.01); *F24F 11/001* (2013.01); *F24F 2011/0068* (2013.01); *G05D 23/1932* (2013.01)

(58) Field of Classification Search
CPC .......... F02M 21/0215; F02M 21/0227; G05D 23/1905; G05D 23/1932; G05D 23/1917; G05B 13/0275; G05B 15/02; G05B 2219/2642; G05B 23/0232; G05B 17/02; H04L 12/2803; H04L 12/2827; H04L 12/2834; H04L 12/2838; H04L 2012/285; H04L 41/06; H04L 43/06; H04L 43/081
USPC .............. 700/276; 455/7, 426.2, 404.1, 404.2
See application file for complete search history.

(56) References Cited

U.S. PATENT DOCUMENTS

| | | | | |
|---|---|---|---|---|
| 3,978,479 | A * | 8/1976 | Schmitz ........................ | 340/502 |
| 4,064,498 | A * | 12/1977 | Burr et al. ..................... | 340/529 |
| 4,161,882 | A * | 7/1979 | Golch ............................ | 60/527 |
| 4,329,870 | A * | 5/1982 | Farmer ........................... | 73/23.2 |
| 4,476,706 | A * | 10/1984 | Hadden et al. ................ | 73/1.07 |

(Continued)

OTHER PUBLICATIONS

The Patent Office of the People's Republic of China First Office Action Application No. 200980158367.3 Issued: Jun. 6, 2013 16 pages.

*Primary Examiner* — Robert Fennema
*Assistant Examiner* — Thomas Stevens
(74) *Attorney, Agent, or Firm* — St. Onge Steward Johnston & Reens, LLC

(57) ABSTRACT

A control system for controlling at least one environmental parameter in an operating area in response to sensor signals. The system includes a central control unit, actuators and mobile sensor units, and also at least one, preferably a plurality, of communication nodes which are placed in the operating area. Each one of the communication nodes is configured to mediate signals between the sensor units and the central control unit in a monitoring area by wirelessly receiving sensor signals from sensor units located within its monitoring area and forwarding the sensor signals to the central control unit. A monitoring area of a communication node is defined by the signal coverage of the communication node.

19 Claims, 2 Drawing Sheets

(56) References Cited

U.S. PATENT DOCUMENTS

| | | | |
|---|---|---|---|
| 4,485,666 A * | 12/1984 | Higgins et al. | 73/23.2 |
| 4,490,213 A * | 12/1984 | Anthony | 201/17 |
| 4,562,723 A * | 1/1986 | Hubner | 73/31.07 |
| 4,569,223 A * | 2/1986 | Hubner | 73/23.2 |
| 4,665,385 A * | 5/1987 | Henderson | 340/539.26 |
| 5,049,861 A * | 9/1991 | Grace et al. | 340/632 |
| 5,087,099 A * | 2/1992 | Stolarczyk | 299/1.6 |
| 5,188,427 A * | 2/1993 | LeBegue et al. | 299/12 |
| 5,275,553 A * | 1/1994 | Frish et al. | 431/76 |
| 5,427,313 A * | 6/1995 | Davis et al. | 236/49.3 |
| 5,637,872 A * | 6/1997 | Tulip | 250/338.5 |
| 5,682,145 A * | 10/1997 | Sweetman et al. | 340/632 |
| 5,748,325 A * | 5/1998 | Tulip | 356/437 |
| 5,921,763 A * | 7/1999 | Martin | 431/5 |
| 6,969,123 B2 * | 11/2005 | Vinegar et al. | 299/3 |
| 7,075,476 B2 | 7/2006 | Kim | |
| 7,133,800 B2 * | 11/2006 | Delin et al. | 702/125 |
| 7,218,996 B1 * | 5/2007 | Beitelmal et al. | 700/276 |
| 7,580,710 B2 * | 8/2009 | Katz et al. | 455/445 |
| 7,603,138 B2 * | 10/2009 | Zhang et al. | 455/556.1 |
| 7,663,502 B2 * | 2/2010 | Breed | 340/12.25 |
| 8,167,216 B2 * | 5/2012 | Schultz et al. | 236/51 |
| 2002/0027504 A1 * | 3/2002 | Davis et al. | 340/540 |
| 2005/0154494 A1 * | 7/2005 | Ahmed | 700/275 |
| 2006/0156789 A1 * | 7/2006 | Frank et al. | 73/1.06 |
| 2007/0282463 A1 * | 12/2007 | Hodson et al. | 700/20 |
| 2008/0011248 A1 * | 1/2008 | Cutlip et al. | 123/3 |
| 2008/0027679 A1 * | 1/2008 | Shklarski | 702/182 |
| 2008/0084913 A1 * | 4/2008 | Perales et al. | 374/131 |
| 2008/0122634 A1 * | 5/2008 | Mardirossian | 340/573.1 |
| 2009/0027189 A1 * | 1/2009 | Isaksson et al. | 340/539.1 |
| 2009/0133730 A1 * | 5/2009 | McVey | 135/93 |
| 2010/0105308 A1 * | 4/2010 | Masse | 454/168 |

* cited by examiner

SYSTEM FOR CONTROLLING AN AMBIENT AIR PARAMETER

CROSS-REFERENCE TO RELATED APPLICATIONS

The present application is a continuation of pending International patent application PCT/EP2009/053661 filed on Mar. 27, 2009 which designates the United States and the content of which is incorporated herein by reference.

FIELD OF THE INVENTION

The present invention relates to a control system for controlling at least one environmental parameter, such as temperature or air quality, in an operating area in response to sensor signals, the system having a central control unit, actuators and mobile sensor units.

BACKGROUND OF THE INVENTION

In many of today's control systems, actuators are constantly operating in order to maintain a certain level of an environmental parameter in an operating area. For instance in a mine, fans are operating to ventilate the mine irrespective of if humans and/or working machines are present in a certain area of the mine or not. Other ventilation systems for mines are controlled manually, and ventilation is increased manually in areas where work is performed. In refrigerating chambers cooling elements are operating in response to a single thermometer, although the temperature can be correct in some areas of the chamber while to high in others.

EP 1068602 B1 discloses a control system in which actuators in a building are controlled in response to human physiological signals, wirelessly transmitted from a sensor device carried by a human to a common control device which controls the operation of the actuators. For instance, it is disclosed that the air-conditioning of the building can be controlled by the control device in response to sensor signals from sensor devices, which measure the temperature of the skin of humans carrying said sensor devices in said building. The effect of the air-conditioning is then controlled so as to optimize the skin temperature of humans in the building.

SUMMARY OF THE INVENTION

The object of the present invention is to provide a new and energy saving control system for controlling at least one environmental parameter, such as temperature or air quality, in an operating area in response to sensor signals.

This object is according to the invention achieved by means of a control system having the features defined in the claims. In certain embodiments, the system comprises a central control unit, actuators and mobile sensor units, wherein: the central control unit communicates with the actuators and sensor units, and is configured to send control signals to the actuators based on sensor signals from the sensor units, the actuators are placed in the operating area or in the vicinity to the operating area and are configured to receive control signals from the central control unit and operate to affect the at least one environmental parameter in the operating area, the respective sensor unit is configured to measure the at least one environmental parameter in the operating area when said sensor unit is located in said operating area.

The control system also may also have at least one, preferably a plurality, of communication nodes which are placed in the operating area, wherein each one of the communication nodes is configured to mediate signals between the sensor units and the central control unit in a monitoring area by wirelessly receiving sensor signals from sensor units located within its monitoring area and forward the sensor signals to the central control unit, wherein a communication node's monitoring area is defined by the signal coverage of said communication node.

In certain embodiments of the invention, communication nodes are present in the operating area for wirelessly receiving sensor signals from the sensor units and thereafter mediating the sensor signals to the central control unit. It is thereby possible to control actuators in operating areas where walls or other barriers impenetrable for wireless signals are present, e.g. in mines.

According to an embodiment of the invention the central control unit is configured to automatically configure a sensor unit moving into a monitoring area, so that the sensor unit automatically can be put to use, and to automatically remove a sensor unit moving out from the monitoring area from the control system, wherein said configuration of the sensor unit is based on the location of the sensor unit and an identity tag carried by the sensor unit. In this way a manual configuration of each sensor unit moving into or out from the operating area is not needed.

According to another embodiment of the invention the identity tag comprises information about the type of the sensor, e.g. gas sensor, temperature sensor etc, and the calibration status of the sensor, carrying said identity tag. It is important to be able to identify a sensor unit with respect to which group said sensor unit belongs to as well as its calibration status, in order for the central control unit to provide the actuators with accurate control signals. Different sensor units can also be configured to measure different environmental parameters, e.g. a first group of sensor units measure the temperature, a second group of sensor units measure the oxygen level while a third group of sensor units measure the carbon dioxide level.

According to another embodiment of the invention the central control unit is configured to identify in which monitoring area a sensor unit is located based on which communication node that receives the sensor signal from said sensor unit and adapt the operational signal to the actuators according to the location of the sensor unit. A specific sensor unit usually communicates with one communication node at a time, whereby the central control unit can locate in which monitoring area the respective sensor unit is located all the time when the sensor unit moves within the operating area. The control signal to the actuators can thereby be targeted to a specific actuator which operates so as to affect the at least one environmental parameter in that particular monitoring area.

According to another embodiment of the invention the central control unit is configured to send control signals wirelessly to the actuators. By providing a wireless connection between the central control unit and the actuators, the actuators can be mobile, e.g. mobile fan units or mobile heating elements.

According to another embodiment of the invention the operating area is a mine, at least some of the actuators are fans configured to provide fresh air to the mine and the sensor units comprise at least one gas sensor configured to measure the concentration of a certain gas affecting the quality of the air in the mine, such as carbon dioxide, oxygen, nitrogen oxides etc. By implementing a control system of the invention for ventilation in a mine costs can be saved for the mining company if the operation of the fans can be reduced when their operation is not needed, i.e. when there are no people working in particular areas. Moreover, communication nodes which cover the operating area with their respective monitoring areas mediate sensor signals from the sensor units to the central control unit in situations where the paths between the sensor units and the central control unit are blocked by rocks in the mine.

According to another embodiment of the invention the sensor units are carried by vehicles or people working in the mine. Efficient ventilation is most important in areas of the mine where people are working, and therefore it is only necessary to have sensor units carried by people or vehicles working in the mine, and fixedly mounted sensor units in the mine are not necessary. Fixedly mounted sensors units would have to be removed prior to blasting, and by instead having the sensor units carried by the people and/or vehicles in the mines no such precautions are needed since there will be no people or vehicles within the blasting area. However, fixedly mounted sensor units can of course provide a complement to the mobile sensor units.

According to another embodiment of the invention, when a gas sensor detects a deterioration in the air quality, such as a low level of oxygen or a high level of carbon dioxide, carbon monoxide or nitrogen oxide, in a monitoring area, the central control unit is configured to respond to the sensor signal from the gas sensor by sending a control signal to a fan, or a group of fans, operating in said monitoring area, wherein the control signal orders the fan or the group of fans to increase the ventilation in said monitoring area. Hereby, the speed of the ventilation fans can be set to a minimum when no work is performed in areas where said fans are operating and if needed the speed of the fans can be increased. In this way fan operating costs can be significantly saved.

According to another embodiment of the invention at least some of the actuators are temperature regulating actuators configured to regulate the temperature in the operating area and the sensor units comprise at least one temperature sensor configured to measure the temperature in the operating area. In this way the temperature can be carefully controlled in areas where needed. It is for instance not necessary to keep a strictly controlled low temperature in areas in refrigerating chambers where nothing is stored at the moment.

According to another embodiment of the invention at least some of the temperature sensors are carried by machines, people or workpieces in the operating area, or objects stored in the operating area. In this way monitoring of the temperature is performed in areas where temperature monitoring is important. In a refrigerating chamber it is for instance only important to maintain a low temperature in areas where objects are stored. In unused areas of the chamber the temperature can be permitted to be slightly higher.

Other advantages and advantageous features of the invention will appear from the dependent claims and the subsequent description.

BRIEF DESCRIPTION OF THE DRAWINGS

With reference to that appended drawings, below follows a specific description of embodiments of the invention cited as examples.

In the drawing.

DETAILED DESCRIPTION OF THE INVENTION

Explained herein are preferred embodiments of the invention, describing the control system of the invention. The invention may, however, be embodied in many different forms and should not be construed as being limited to the exemplary embodiments set forth herein; rather, these embodiments are provided so that this disclosure will be thorough and complete, and will fully convey the concept of the invention to those skilled in the art.

Figure 1:
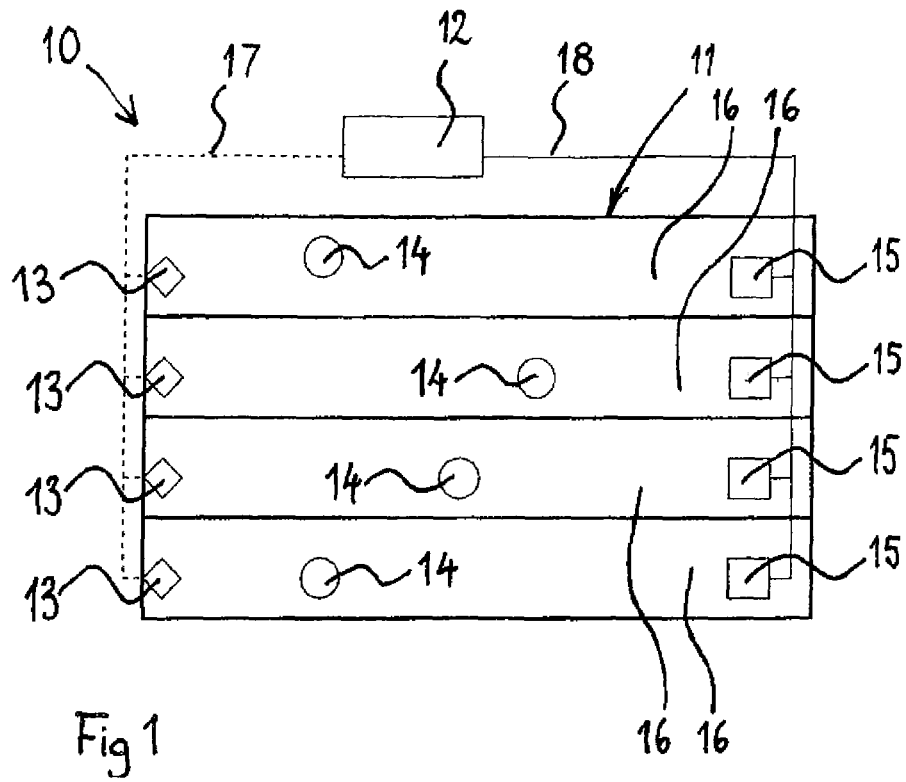
FIG. 1 shows very schematically a control system according to one embodiment of the invention.

FIG. 1 shows a control system 10 according to an embodiment of the invention for controlling at least one environmental parameter, such as temperature or air quality, in an operating area 11 in response to sensor signals. The control system 10 shown in FIG. 1 comprises a central control unit 12, four actuators 13, four mobile sensor units 14 and four communication nodes 15, but of course the control system according to the invention can comprise any other number of actuators 13, sensor units 14, and communication nodes 15.

The central control unit 12 communicates with the actuators 13, via a control line 17, and with the sensor units 14, and is configured to send control signals to the actuators 13 based on sensor signals from the sensor units 14. The control signal can for instance be an operating signal to actuators, such as fans or heating elements, ordering the fan to increase or decrease the ventilation or the heating element to increase the temperature or turn of the heating. The actuators 13 are placed in the operating area 11 or in the vicinity to the operating area 11 and are configured to receive control signals from the central control unit 12 and operate to affect the at least one environmental parameter in the operating area 11. The central control unit 12 can also be configured to send control signals wirelessly to the actuators 13. If for instance the control system 10 is a control system for controlling atmospheric humidity in an operating area the actuators 13 can be provided as mobile fan units and to facilitate the mobility of the fan units the central control unit 12 preferably sends the control signal wirelessly.

The respective sensor unit 14 is configured to measure the at least one environmental parameter in the operating area 11 when said sensor unit 14 is located in said operating area 11 and send a sensor signal to the central control unit 12 based on said measurement. The sensor signal can for instance be a temperature reading from a thermometer or a spectrum from a spectrometer working as a gas sensor. The sensor units 14 comprise sensing means, e.g. spectrometer, thermometer or any other sensing means, a processor for preparing sensor signals based on measurements from the sensing means and transmitters for wirelessly sending the sensor signals to communication nodes 15.

The communication nodes 15 can be any type of receivers of wireless signals and are placed in the operating area 11 and each one of the communication nodes 15 is configured to mediate signals between the sensor units 14 and the central control unit 12 in a monitoring area 16. This is performed by the communication nodes 15 by wirelessly receiving sensor signals from sensor units 14 located within its monitoring area 16 and forwarding the sensor signals to the central control unit 12 via a communication line 18. A communication node's monitoring area 16 is defined by the signal coverage of said communication node 15. Preferably all the areas of interest in the operating area are covered by the monitoring areas 16 of the communication nodes 15. Areas of interest can for instance be locations in a mine where work is performed if the control system 10 is configured for controlling the ventilation in the mine. If two or more communication nodes 15 receive sensor signals from the same sensor unit 14, the signal strength of the sensor unit 14 can be used to determine which one of the communication nodes 15 that is closest to the sensor unit 14, and thereby the sensor unit 14 can be more precisely located. If two or more sensor units 14, measuring the same environmental parameter, send sensor signals to the same communication node 15, the most critical measurement is chosen and taken into account by the central control unit 12 when preparing the control signal for the actuators 13 operating in that communication node's monitoring area 16. For instance if the control system 10 is configured to control the ventilation in a mine and two sensor units 14 in the same monitoring area 16 of a communication node 15 are measuring two different values of the oxygen concentration, the sensor signal from the sensor unit 14 measuring the lowest oxygen concentration is chosen by the central control unit 12 for establishing the control signal to actuators 13 operating in that monitoring area 16. The reason for this is that the oxygen level can vary locally due to stratification of the atmosphere in the mine and the lowest measured level of oxygen is of course the most critical measurement, which must be counter-acted by the actuators 13.

The central control unit 12 is configured to automatically configure a sensor unit 14 moving into a monitoring area 16, so that the sensor unit 14 automatically can be put to use, and to automatically remove a sensor unit 14 moving out from the monitoring area 16 from the control system 10. Said configuration of the sensor unit 14 comprises identification, by an identity tag carried by the sensor unit 14, and position finding of the sensor unit 14 as well as incorporation of the sensor unit 14 into the control system 10 by assigning said sensor unit 14 to an actuator 13 that operates to affect the at least one environmental parameter in the area of the sensor unit 14. The identity tag provides the identity of the sensor unit 14, which comprises information about the type of environmental parameter the sensor can measure, e.g. gases, temperature etc, and the calibration status of the sensor unit 14, e.g. when the sensor unit 14 was last calibrated. The position finding of a sensor unit 14 is performed by the central control unit 12 by identification in which monitoring area 16 the sensor unit 14 is located based on which communication node 15 that receives the sensor signal from said sensor unit 14. When a measured value of an environmental parameter from a sensor unit 14 is determined by the central control unit 12 to be out of the range of a certain accepted interval in a monitoring area 16, the central control unit 12 sends a control signal to an actuator 13, which orders the actuator 13 to operate so as to affect the environmental parameter to change to a value within the accepted interval again in that monitoring area 16.

When the control system 10 of FIG. 1 is in use, the sensor units 14 located within the operating area 11 measure the at least one environmental parameter in the operating area 11 continuously or repeatedly and the respective sensor unit 14 sends sensor signals wirelessly, by for instance wireless LAN, radio signals etc, to a communication node 15, in whose monitoring area 16 the sensor unit 14 is located. The communication node 15 mediates the sensor signals to the central control unit 12. The central control unit 12 evaluates the signals from the sensor unit 14 and prepares a control signal. The evaluation of a sensor signal comprises comparison of the signal with stored data and determination if said signal lies within a certain accepted interval for the measured environmental parameter. If for instance the sensor signals provide information about an increase of an environmental parameter over a certain threshold value in a monitoring area 16, a control signal is sent to at least one of the actuators 13, affecting said environmental parameter in said monitoring area 16, in response to said sensor signals, ordering the actuator/actuators 13 to work against said increase of the environmental parameter so as to place said environmental parameter under said threshold value.

Figure 2:
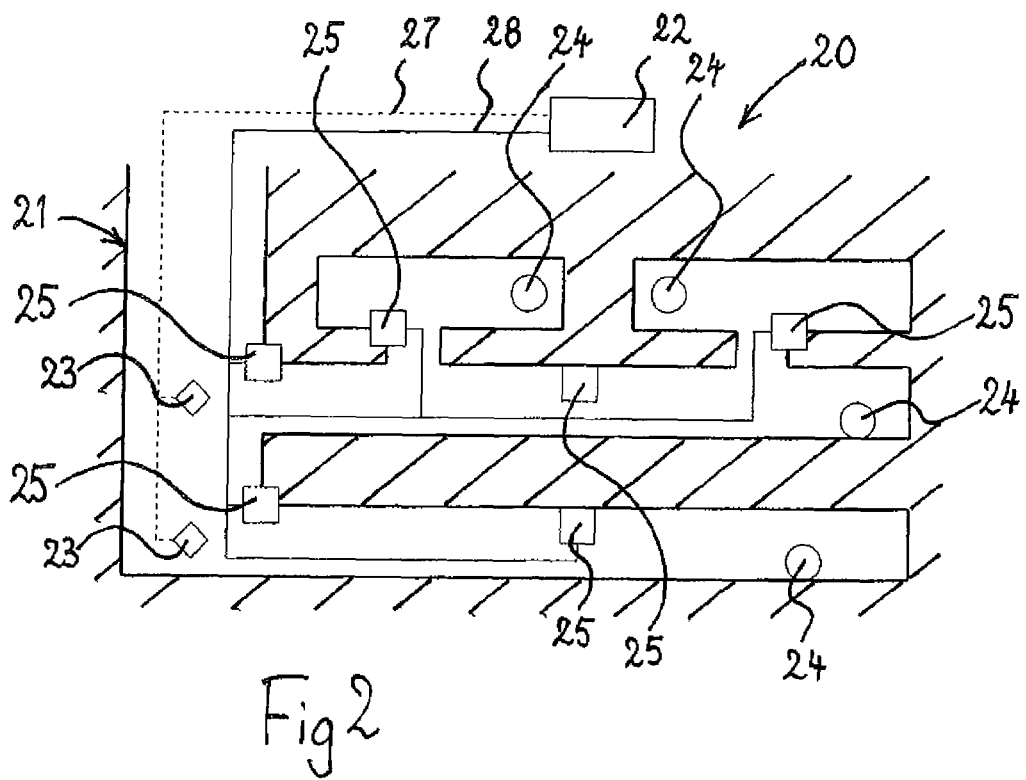
FIG. 2 shows very schematically a control system according to the invention for controlling the ventilation in a mine.

In FIG. 2 it is shown very schematically a control system 20 according to the invention for ventilation of a mine 21. The control system 20 comprises a central control unit 22, two actuators in the form of fans 23, four mobile sensor units 24 carried by vehicles or people working in the mine, and six communication nodes 25. The control system 20 can of course comprise any number of fans 23, sensor units 24 and communication nodes 25.

The central control unit 22 communicates with the fans 23 via a fan control line 27 and with the sensor units 24, and is configured to send control signals to the fans 23 based on sensor signals from the sensor units 24. The control signals can for instance comprise orders about decrease or increase of the speed of the fans 23. The fans 23 are placed in the mine 21, especially at entrances to mine adits, and are configured to provide the mine 21 with fresh air. The fans 23 are also configured to receive control signals from the central control unit 22 and operate to affect the air quality in the mine 21, by for instance reducing or increasing the fan speed.

The respective sensor unit 24 is configured to measure at least one parameter affecting the air quality in the mine, e.g. the concentration of certain gases, such as carbon dioxide, carbon monoxide, oxygen or $NO_x$, or the air temperature, in the mine 21 when said sensor unit 24 is located in said mine 21. Thereafter the sensor unit 24 sends a sensor signal to the central control unit 22 based on said measurement. A sensor unit 24 can for instance comprise a spectrometer, a processor unit which logs and processes spectra and a transmitter for wirelessly sending sensor signals to communication nodes 25.

The communication nodes 25 are placed in the mine 21 and each one of the communication nodes 25 is configured to mediate signals between sensor units 24 and the central control unit 22. A respective communication node 25 wirelessly receives sensor signals from sensor units 24 located within said communication node's monitoring area and forwards the sensor signals to the central control unit 22, via a communication line 28. A communication node's monitoring area is defined by the signal coverage of said communication node 25 and the communication nodes 25 are placed in the mine so as to by their signal coverage cover essentially all areas in the mine 21 where work is performed and/or people are present.

The central control unit 22 is configured to automatically configure a sensor unit 24 moving into a monitoring area, so that the sensor unit 24 automatically can be put to use, and to automatically remove a sensor unit 24 moving out from the monitoring area from the control system 20. Said configuration of the sensor unit 24 is based on the location of the sensor unit 24 and an identity tag carried by the sensor unit 24. The identity tag comprises information about the type of the sensor, e.g. gas sensor, temperature sensor etc, and the calibration status of the sensor, e.g. when the sensor unit 24 was last calibrated. An advantage by having the sensor units 24 carried by vehicles and people working in the mine 21 is that the sensor units 24 can regularly be carried up from the mine 21, to a collecting central or the like where sensor calibration can be performed. The central control unit 22 is also configured to identify in which monitoring area a sensor unit 24 is located based on which communication node 25 that receives the sensor signal from said sensor unit 24 and adapt the control signal to the fans 23 according to the location of the sensor unit 24. If for instance the level of carbon monoxide is too high (over a certain threshold value) in a specific area, the central control unit 22 receives sensor signals from a sensor unit 24 located in that specific area. The signals indicate that the level of carbon monoxide is too high, and the central control unit 22 sends a control signal to a fan 23, operating in that particular area, which orders the fan 23 to ventilate at a higher speed.

Thus, when a gas sensor 24 in the mine 21 detects a deterioration in the air quality, such as a low level of oxygen or a high level of carbon dioxide, carbon monoxide or nitrogen oxide, in a monitoring area, the central control unit 22 is configured to respond to the sensor signal from the gas sensor 24 by sending a control signal to a fan 23, or a group of fans 23, operating in said monitoring area, wherein the control signal orders the fan 23 or the group of fans 23 to increase the ventilation in said monitoring area.

Figure 3:
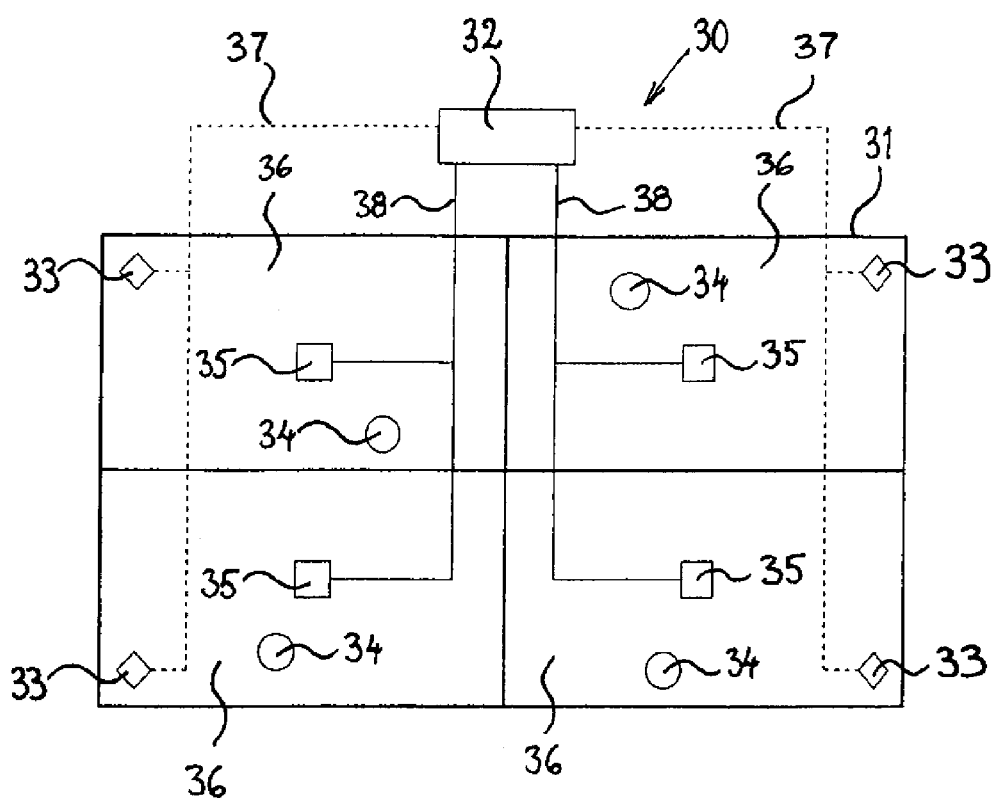
FIG. 3 shows very schematically a control system according to the invention for controlling the temperature in a refrigerating chamber.

In FIG. 3 it is shown very schematically a control system 30 according to the invention for temperature control in a refrigerating chamber 31. The control system 30 comprises a central control unit 32, four actuators in the form of cooling fans 33, four mobile temperature sensor units 34 carried by for instance objects stored in the refrigerating chamber 31, and four communication nodes 35.

The central control unit 32 communicates with the cooling fans 33 via a control line 37 and with the temperature sensor units 34, and is configured to send control signals to the cooling fans 33 based on sensor signals from the temperature sensor units 34.

The cooling fans 33 are placed in the refrigerating chamber 31, and are configured to receive control signals from the central control unit 32 and operate to affect the temperature in the refrigerating chamber 31.

The respective temperature sensor unit 34 is configured to measure the temperature in the refrigerating chamber 31 when said temperature sensor unit 34 is located in said refrigerating chamber 31 and send a sensor signal to the central control unit 32 based on said measurement. A temperature sensor unit 34 can for instance comprise a thermometer, a processor unit which logs and processes the temperature read and a transmitter for wirelessly sending sensor signals to communication nodes 35.

The communication nodes 35 are placed in the refrigerating chamber 31 and each one of the communication nodes 35 is configured to mediate signals between the temperature sensor units 34 and the central control unit 32 in a monitoring area 36 by wirelessly receiving sensor signals from temperature sensor units 24 located within its monitoring area 36 and forward the sensor signals to the central control unit 32, via a communication line 38. A communication node's monitoring area 36 is defined by the signal coverage of said communication node 35 and the communication nodes 35 are placed in the refrigerating chamber 31 so as to by their signal coverage cover essentially all places in the chamber 31 where chilled goods can be stored.

The central control unit 32 is configured to automatically configure a temperature sensor unit 34 moving into a monitoring area 36, so that the temperature sensor unit 34 automatically can be put to use, and to automatically remove a temperature sensor unit 34 moving out from the monitoring area 36 from the temperature control system 30. Said configuration of the temperature sensor unit 34 is based on the location of the temperature sensor unit 34 and an identity tag carried by the temperature sensor unit 34. The identity tag comprises information about for instance the calibration status of the temperature sensor, e.g. when the temperature sensor unit 34 was last calibrated. The temperature control system 31 can of course comprise any number of communication nodes 35 needed and the number of temperature sensor units 34 can be very high if for instance the refrigerating chamber 31 is a food storage chamber for frozen foods, wherein each box of food has its own temperature sensor unit 34 which communicates wirelessly with any of the communication nodes 35. The central control unit 32 is also configured to identify in which monitoring area 36 a temperature sensor unit 34 is located based on which communication node 35 that receives the sensor signal from said temperature sensor unit 34 and adapt the control signal to the cooling fans 33 according to the location of the temperature sensor unit 34.

The invention is of course not in any way limited to the embodiments described above. On the contrary, several possibilities to modifications thereof should be apparent to a person skilled in the art without departing from the basic idea of the invention as defined in the appended claims.

What is claimed is:

1. A control system for controlling at least one environmental parameter in an operating area in response to sensor signals, the system comprising a central control unit, actuators and mobile sensor units, wherein:
    the central control unit communicates with the actuators and the sensor units, and is configured to send control signals to the actuators based on the sensor signals from the sensor units,
    the actuators are placed in the operating area or in a vicinity to the operating area and are configured to receive the control signals from the central control unit and operate to affect the at least one environmental parameter in the operating area,
    the mobile sensor units being configured to measure the at least one environmental parameter in the operating area when the sensor units are located in said operating area,
    characterized in, that the control system also comprises at least one, preferably a plurality, of communication nodes which are placed in the operating area, wherein each one of the communication nodes is configured to mediate signals between the sensor units and the central control unit in a monitoring area by wirelessly receiving the sensor signals from the sensor units located within the monitoring area and forwarding the sensor signals to the central control unit, wherein the monitoring area of at least one communication node is defined by the signal coverage of said at least one communication node.

2. The control system of claim 1, characterized in that the central control unit is configured to automatically configure at least one of the sensor units moving into the monitoring area, so that the sensor unit automatically can be put to use, and to automatically remove the at least one sensor unit moving out from the monitoring area from the control system, wherein said configuration of the sensor unit is based on the location of the sensor unit and an identity tag carried by the sensor unit.

3. The control system of claim 2, characterized in that the identity tag comprises information about the type of the sensor unit and the calibration status of the sensor unit carrying said identity tag.

4. The control system of claim 1, characterized in that the central control unit is configured to identify in which monitoring area a sensor unit is located based on which communication node that receives the sensor signal from said sensor unit and adapt the control signal to the actuators according to the location of the sensor unit.

5. The control system of claim 1, characterized in that the central control unit is configured to send control signals wirelessly to the actuators.

6. The control system of claim 1, characterized in that the operating area is a mine, at least some of the actuators are fans configured to provide fresh air to the mine and the sensor units comprise at least one gas sensor configured to measure the concentration of a certain gas affecting the quality of the air in the mine.

7. The control system of claim 6, characterized in that the sensor units are carried by vehicles or people working in the mine.

8. The control system of claim 6, characterized in that when a gas sensor detects a deterioration in the air quality in a monitoring area, the central control unit is configured to respond to the sensor signal from the gas sensor by sending a control signal to a fan, or a group of fans, operating in said monitoring area, wherein the control signal orders the fan or the group of fans to increase the ventilation in said monitoring area.

9. The control system of claim 1, characterized in that at least some of the actuators are temperature regulating actuators configured to regulate the temperature in the operating area and that the sensor units comprise at least one temperature sensor configured to measure the temperature in the operating area.

10. The control system of claim 9, characterized in that at least some of the temperature sensors are carried by machines, people or workpieces in the operating area, or are objects stored in the operating area.

11. The control system of claim 9, characterized in that the temperature regulating actuators comprise a heater.

12. The control system of claim 9, characterized in that the temperature regulating actuators comprise a cooler.

13. The control system of claim 1, characterized in that the at least one environmental parameter comprises temperature.

14. The control system of claim 1, characterized in that the at least one environmental parameter comprises air quality.

15. The control system of claim 6, characterized in that the certain gas comprises carbon dioxide, carbon monoxide, oxygen, or nitrogen oxide.

16. The control system of claim 8, characterized in that the deterioration in the air quality comprises a certain level of oxygen, carbon dioxide, carbon monoxide or nitrogen oxide.

17. The control system of claim 11, characterized in that the heater comprises an oven element or heating fan.

18. The control system of claim 12, characterized in that the cooler comprises a refrigerator element or cooling fan.

19. The control system of claim 1, characterized in that the at least one environmental parameter comprises at least two environmental parameters that are measured by different types of sensors.

* * * * *